(12) United States Patent
Chern et al.

(10) Patent No.: US 6,398,622 B1
(45) Date of Patent: Jun. 4, 2002

(54) POLISHING MECHANISM FOR VEHICLE BUMPER

(75) Inventors: Jeng-Gang Chern, Taipei Hsian; Shih-Chien Chiang; Kuang-Ying Lu, both of Taipei, all of (TW)

(73) Assignee: Asea Brown Boveri Ltd., Taipei (TW)

( * ) Notice: Subject to any disclaimer, the term of this patent is extended or adjusted under 35 U.S.C. 154(b) by 0 days.

(21) Appl. No.: 09/734,166

(22) Filed: Dec. 12, 2000

(51) Int. Cl.[7] ............................................... B24B 49/00
(52) U.S. Cl. .................. 451/22; 451/8; 451/9; 451/11; 451/21; 451/177; 451/398
(58) Field of Search ............................ 451/8, 9, 11, 21, 451/22, 177, 398

(56) References Cited

U.S. PATENT DOCUMENTS 6,042,163 A * 3/2000 Reiffer ........................ 293/155

* cited by examiner

*Primary Examiner*—Joseph J. Hail, III
*Assistant Examiner*—Shantese McDonald
(74) *Attorney, Agent, or Firm*—Rosenberg, Klein & Lee

(57) ABSTRACT

A polishing mechanism for treating a vehicle bumper incorporating with a multi-shaft robot is disclosed. A polishing wheel is rotationally attached to an end of the robot. A rotational positioning device is provided for positioning the bumper in a position within a working range of the robot. The positioning device includes a pair of racks, a main shaft rotationally arranged between the racks and capable of being positioned to a desired angle, a carrying rack arranged on the main shaft, and a plurality of holding devices arranged on the carrying rack for fixedly holding the bumper in position. A detecting device is provided for checking the worn-out of the polishing wheel for adjusting an optimum distance between the polishing wheel and the bumper. The assembly further includes a piloting gauge attached to the robot for determining an appropriate distance between the polishing wheel and the bumper.

8 Claims, 7 Drawing Sheets

POLISHING MECHANISM FOR VEHICLE BUMPER

BACKGROUND OF THE INVENTION

1. Field of the Invention

The present invention relates to a polishing mechanism, and more particularly to a polishing mechanism provided with a robot and a rotational positioning device for treating a vehicle bumper.

2. Description of the Prior Art

Robots have been widely used in machining processing, such as drilling, cutting, welding, assembling and painting. However, there is still a need of break-through for some machining processing to reach a better result. For example, a vehicle bumper plays a great role in the aesthetic outward appearance of a vehicle and is designed to accommodate to the overall design of the vehicle so as to reach a maximum aesthetic effect. So, the bumper generally includes a plurality of contours in combination with a plurality of angular shapes. This inevitably brings a complex machining process for the bumper, especially in the polishing process. On the other hand, when the bumper is formed by a pressing process from sheet metal, different surfaces may have different planarity. Accordingly, different polishing processes are required to reach a uniform surface. This creates a complex situation for automatic polishing process for the bumper.

Therefore, the polishing process of the bumper is still performed manually which is really not suitable for mass production. In addition, operators usually check the surface planarity visually. Even the surface planarity can be finally achieved, this is really not an effective way. Furthermore, dusts and debris generated during the polishing process will also bring a negative influence to the operators.

SUMMARY OF THE INVENTION

Consequently, a primary object of the present invention is to provide a polishing apparatus incorporating with a multi-shaft robot, a polishing wheel, a polishing wheel detecting device for polishing a vehicle bumper.

Another object of the present invention is to provide a polishing mechanism equipped with a rotational positioning device capable of positioning the vehicle bumper in a position within a working range of said robot. The positioning device mainly comprises a pair of supporting racks, a main shaft rotationally arranged between said supporting racks, a carrying rack arranged on said main shaft, and a plurality of holding devices arranged on said carrying rack for fixedly holding said vehicle bumper in position; and In order to achieve the object set forth, a polishing mechanism for vehicle bumper in accordance with the present invention comprises a multi-shaft robot having a polishing wheel rotationally attached to an end thereof. A rotational positioning device is provided for positioning a bumper in a position within a working range of the robot. The positioning device includes a pair of racks, a main shaft rotationally arranged between the racks and capable of being positioned to a desired angle, a carrying rack arranged on the main shaft, and a plurality of holding devices arranged on the carrying rack for fixedly holding the bumper in position. A detecting device is provided for checking the worn-out of the polishing wheel for adjusting an optimum distance between the polishing wheel and the bumper.

According to one aspect of the present invention, the polish mechanism further includes a piloting gauge attached to the robot for conveniently determining an appropriate distance between the polishing wheel and the bumper.

BRIEF DESCRIPTION OF THE DRAWINGS

Other objects and advantages of the present invention will become apparent from the following detailed description of the preferred embodiments thereof taken in conjunction with the accompanying drawings wherein.

DETAILED DESCRIPTION OF THE PREFERRED EMBODIMENTS

Figure 1:
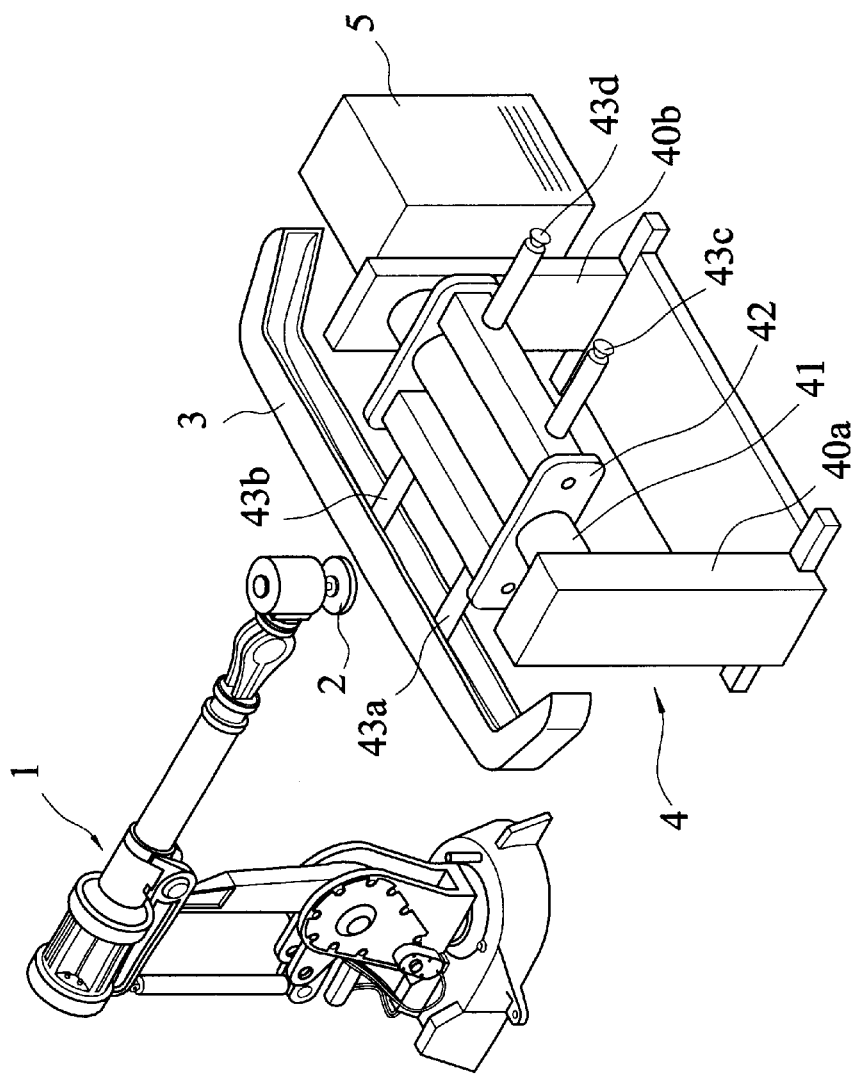
FIG. 1 is a perspective view of a polishing mechanism in accordance with the present invention.
Figure 2:
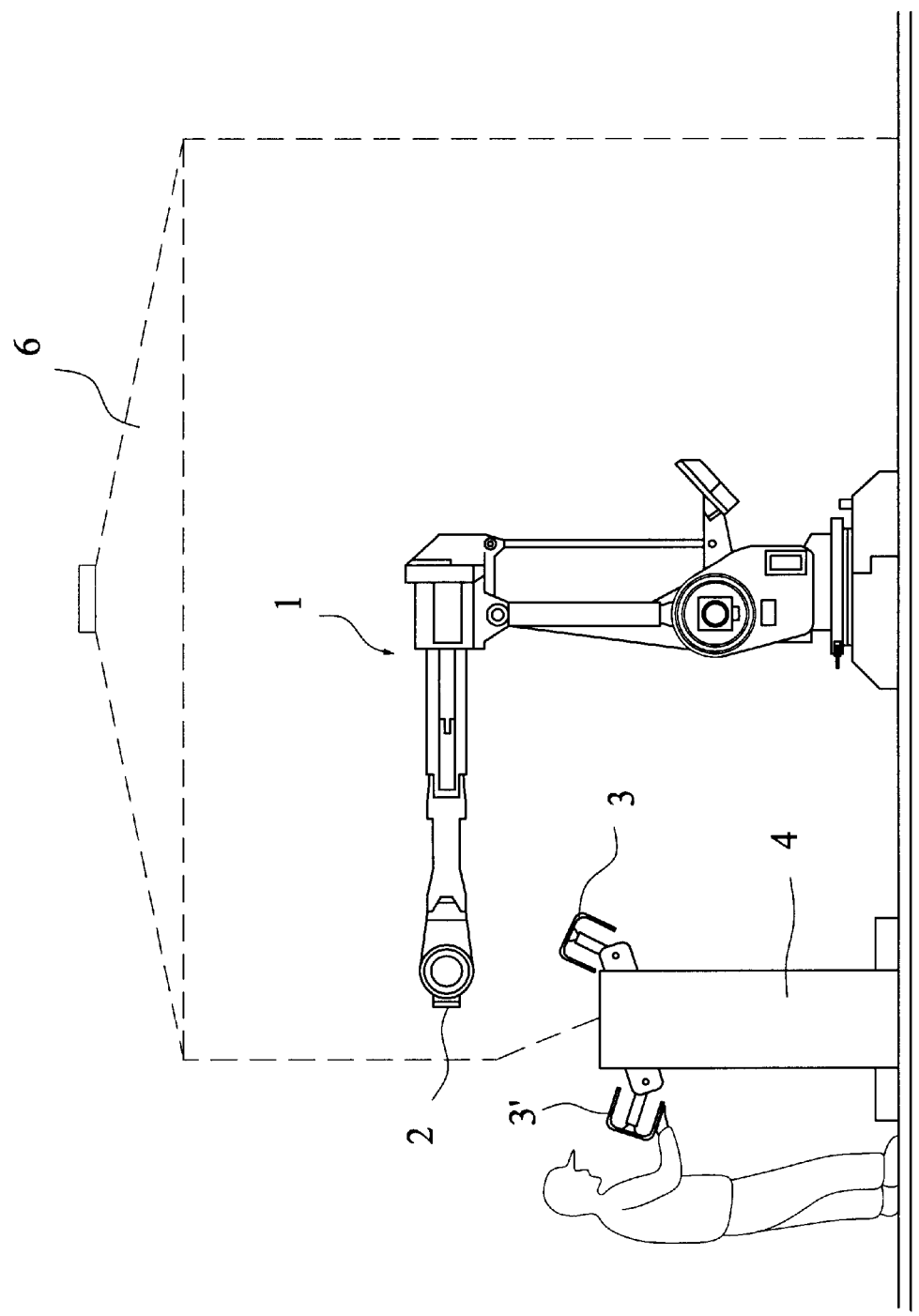
FIG. 2 is a side elevational view of the polishing mechanism of the present invention.
Figure 3:
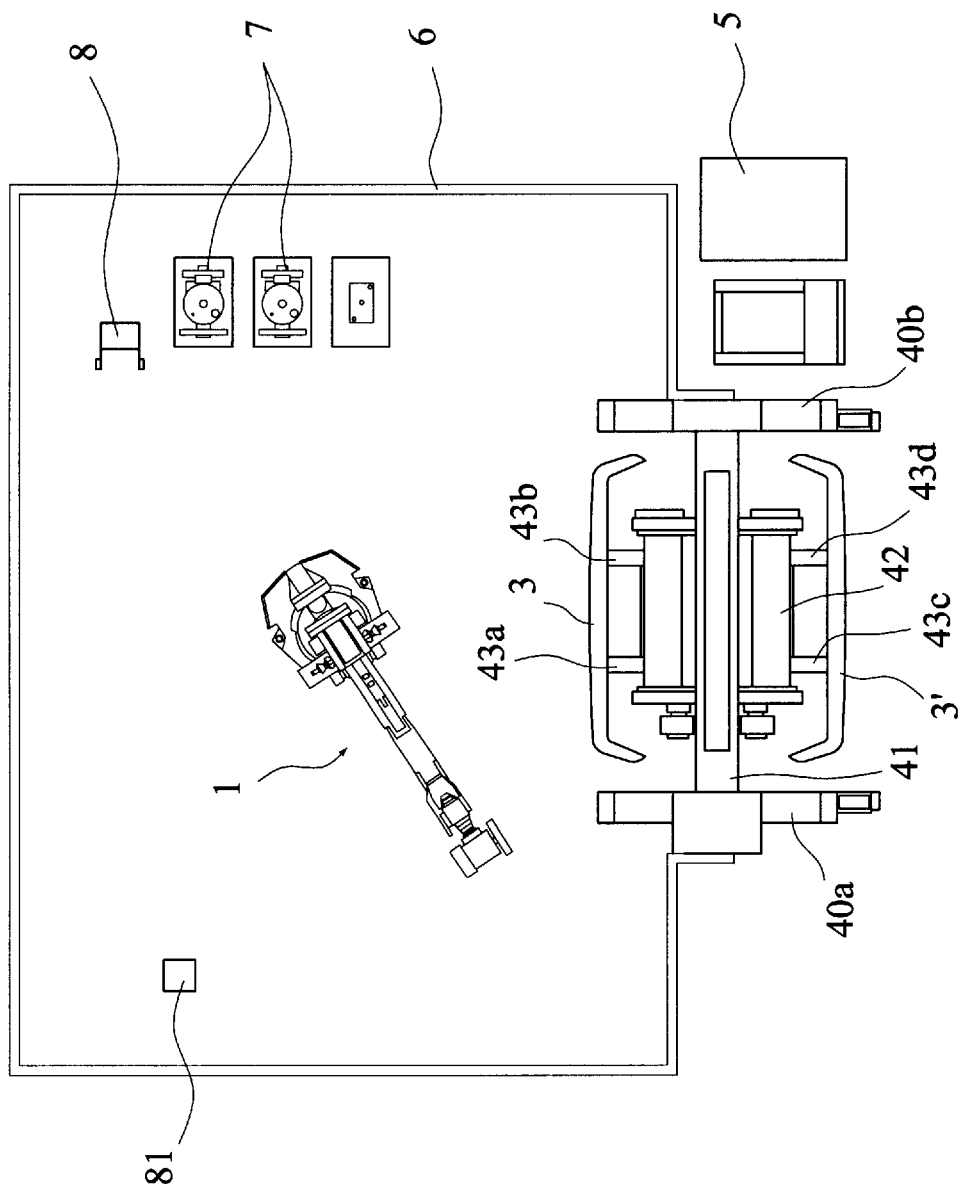
FIG. 3 is a top view of the polishing mechanism of the present invention.

With reference to the drawings and in particular to FIGS. 1 and 2, a polishing mechanism for vehicle bumper in according with the present invention comprises a multi-shaft robot 1 having a polishing wheel 2 rotationally attached to an end thereof for polishing a vehicle bumper 3. A rotational positioning device 4 is provided for positioning the bumper 3 in a positioning within a working range of the robot 1 for polishing the vehicle bumper.

A controller 5 is provided adjacent to the rotational positioning device 4 for supplying electrical power and controlling the polishing mechanism of the present invention. The controller 5 includes a plurality of pushing buttons for performing the processes.

The positioning device 4 holds the bumper 3 thereon by through a conventional manner and includes a pair of supporting racks 40a, 40b. A main shaft 41 is rotationally arranged between the supporting racks 40a, 40b and capable of being positioned to a desired angle. A carrying rack 42 is arranged on the main shaft 41 in which a plurality of sucking disks 43a, 43b is mounted.

The bumper 3 can be securely held by the sucking disks 43a, 43b, while the main shaft 41 can readily rotate to a desire angle for processing.

In order to readily processing, the carrying rack 42 is also provided with sucking disks 43c, 43d for easy operation. By this arrangement, another bumper 3' can be arranged behind the rotational positioning device 4 when the bumper 3 is undergoing polishing. After the bumper 3 is polished, the main shaft 41 can be rotated such that the bumper 3' is positioned in a desired position for polishing, while the bumper 3 can be readily dismounted therefrom.

During the polishing process, a dust collecting hood 6 is arranged to enclosing the robot 1, the rotational positioning device 4, the controller 5, thereby preventing dust and debris from jeopardizing the health of the operator.

In addition, a polishing mechanism exchanging rack 7 is provided within the working range of the robot 1 and in which different polishing devices are disposed for polishing different workpiece. As a result, the robot 1 can be readily provided with a suitable polishing device when needed.

During the service time of the polishing wheel 2, the worn-out of the polishing wheel 2 has to be periodically checked to ensure a best polishing result on the workpiece. As a result, a polishing wheel worn-out detecting device 8 is provided adjacent the working field of the robot 1. In addition, a polishing wheel repairing device 81 is also provided adjacent to the polishing wheel 2. By the provision of the detecting device 8, the worn-out of the polishing wheel 2 can be readily measured through checking their diameter. Accordingly, an appropriate distance between the polishing wheel 2 and the bumper 3 can be attained again. On the other hand, the detecting device 8 is manipulated by a programmable method.

In the actual operation, the working range, surface planarity, sections, angular requirements, polishing time, and distance between the polishing wheel and the bumper can be input a system previously. Then after the bumper 3 is positioned, the polishing operations can be automatically commenced through the robot 1.

Figure 4:
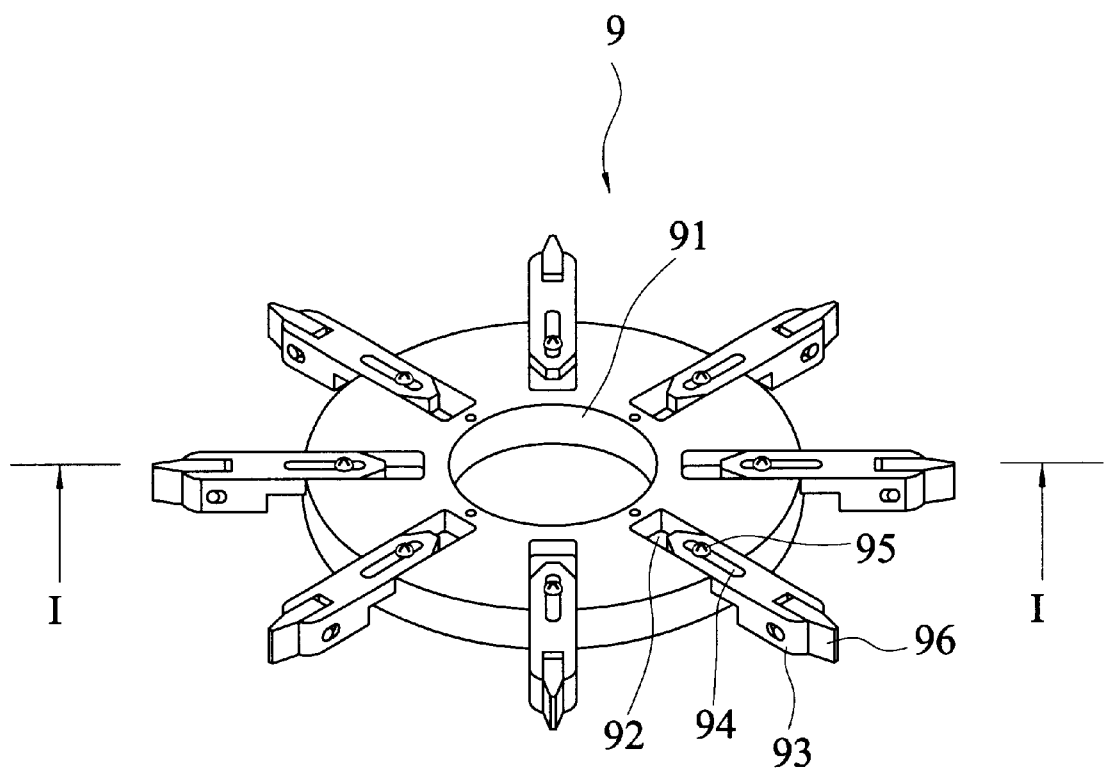
FIG. 4 is a perspective view of a piloting gauge in accordance with the present invention.
Figure 5:
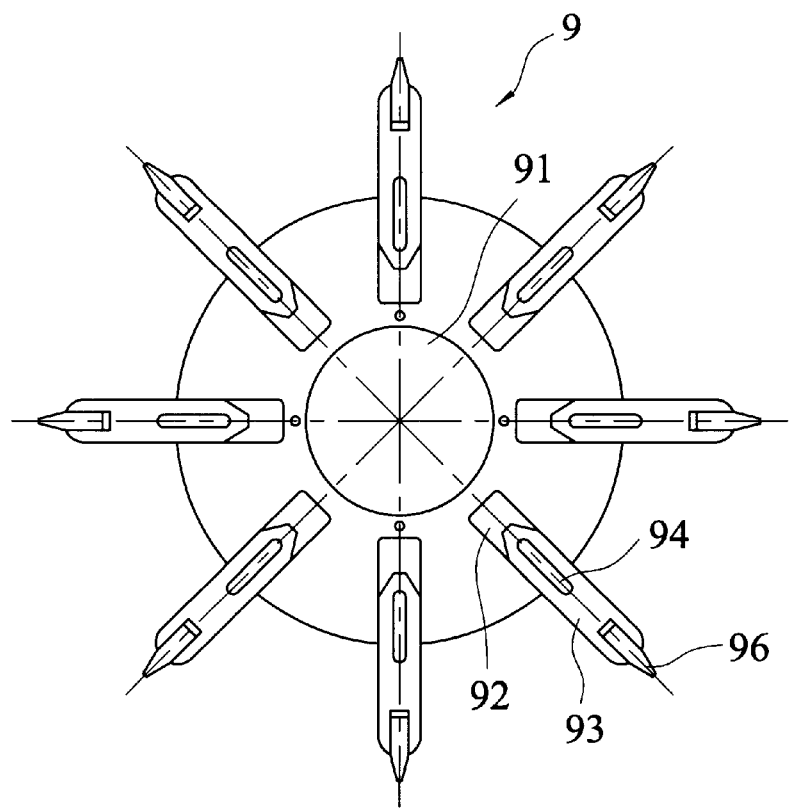
FIG. 5 is a top view of the piloting gauge shown in FIG. 4.
Figure 6:
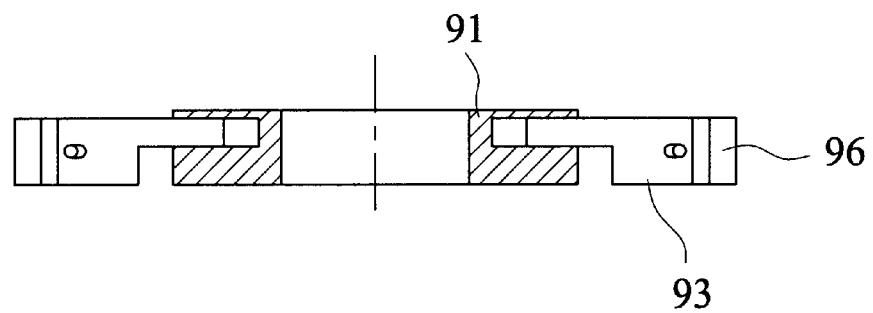
FIG. 6 is a cross sectional view taken along line I—I of FIG. 4.

In order to accurately collect the parameters mentioned above, a piloting gauge 9 can be used to measure the distance between the polishing wheel 2 and the bumper 3. FIG. 4 is a perspective view of the piloting gauge in use, while FIG. 5 is a top view of FIG. 4, while FIG. 6 is a cross sectional view thereof.

Figure 7:
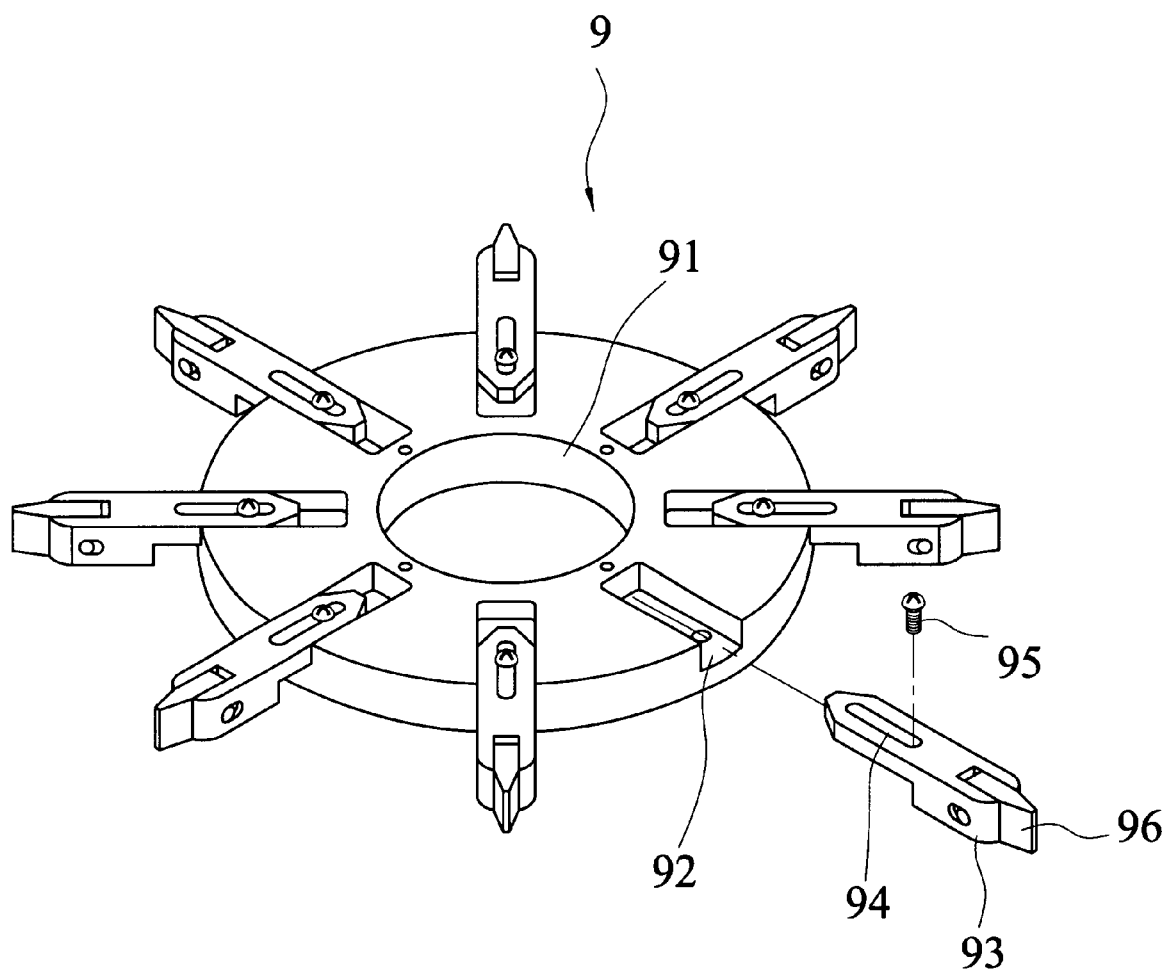
FIG. 7 is a perspective view showing a relational relationship between an adjusting plate and the piloting gauge.
Figure 8:
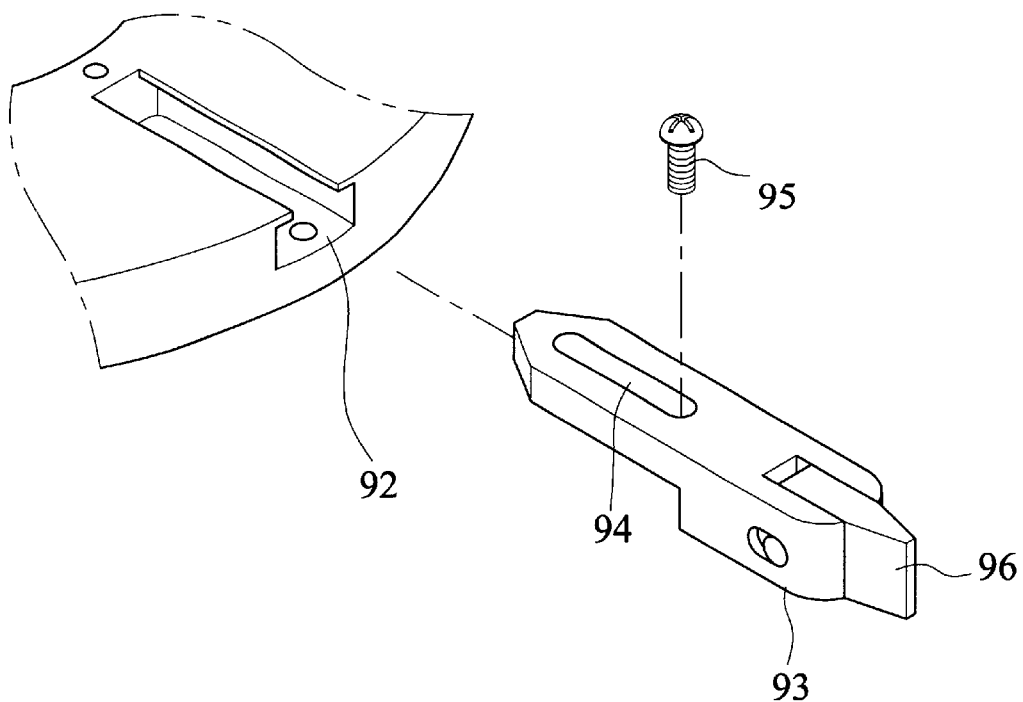
FIG. 8 is an enlarged view of FIG. 7 in which the adjusting plate and the piloting gauge are assembled.

The piloting gauge 9 comprises a circular base member having a mounting hole 91 defined in a center thereof for readily attaching the base member to a polishing shaft of the robot 1. A plurality of grooves 92 is arranged radially along a perimeter of the base member. Each groove 92 can receive an adjusting plate 93 therein, as clearly shown in FIGS. 7 and 8. Each adjusting plate 93 is defined with a through slot 94. The adjusting plate 93 can be moved along a direction of the groove 92. After a desired extension is reached, a bolt 95 extending through the slot 94 can be used to lock the adjusting plate 93 with respect to the groove 92. In addition, each adjusting plate 93 is provided with a buffer 96 which is made from soft material such as a rubber.

When using the piloting gauge 9, the adjusting plate 93 is extended according to the distance between the polishing wheel 2 and the bumper 3. Then the piloting gauge 9 is enveloped onto a shaft of the robot 1. After the piloting gauge 9 is seated, the robot 1 stretches out and touches the bumper 3 to get a reference point. The reference point is the basic reference in which the robot 1 extends to perform the polishing work.

Since the bumper 3 includes a plurality of angular surface portions to be polished, the adjusting plate 3 can be readily used to accommodate the piloting gauge 9 to measure each surface portion to be polished. By the arrangement of the piloting gauge 9, and the multi-shaft robot 1, the distances between the geometrical shapes of the bumper 3 and the polishing wheel 2 can be readily measured.

When all the parameters have been collected, the piloting gauge 9 can be removed from the shaft of the robot and then the polishing wheel 2 is mounted to commence the polishing work.

While specific illustrated embodiment has been shown and described, it will be appreciated by those skilled in the-art that various modifications, changes, and additions can be made to the invention without departing from the spirit and scope thereof as set forth in the following claims.

We claim:

1. A polishing mechanism for a vehicle bumper, comprising:
   a robot equipped with a polishing wheel;
   a rotational positioning device for positioning the vehicle bumper to be polished in a position within a working range of said robot, said positioning device comprising a pair of supporting racks, a main shaft rotationally arranged between said supporting racks, a carrying rack arranged on said main shaft, and a plurality of holding devices arranged on said carrying rack for fixedly holding said vehicle bumper in position; and
   a polishing wheel detecting device for checking a worn-out of said polishing wheel for adjusting an optimum distance between said polishing wheel and said bumper to be polished.

2. The polishing mechanism as recited in claim 1, wherein said holding device comprises a plurality of sucking disks for securely holding said bumper in position.

3. The polishing mechanism as recited in claim 1, wherein said carrying rack comprises a plurality of sucking disks for accessing said bumper.

4. The polishing mechanism as recited in claim 1, further comprising a dust collecting hood arranged to cover said robot, and said rotational positioning device.

5. The polishing mechanism as recited in claim 1, wherein a polishing mechanism exchanging rack is provided within the working range of the robot and in which different polishing devices are disposed for polishing different workpiece.

6. The polishing mechanism as recited in claim 1, further comprising a piloting gauge attached to said robot for determining an appropriate distance between said polishing wheel and said bumper.

7. The polishing mechanism as recited in claim 6, wherein said piloting gauge comprises:
   a circular base member;
   a mounting hole defined in a center of said base member for readily attaching said base member to a polishing shaft of said robot;
   at least a groove arranged radially along a perimeter of said base member;
   at least an adjusting plate assembled in said groove, said adjusting plate comprising a through slot;
   at least a bolt assembled to said adjusting plate for positioning said adjusting plate along said groove when said adjusting plate is extended to a desired length.

8. The polishing mechanism as recited in claim 7, wherein said adjusting plate comprises a buffer at an end thereof and which is made from soft material, such as a rubber.

* * * * *